(12) United States Patent
Willberg et al.

(10) Patent No.: US 8,596,361 B2
(45) Date of Patent: Dec. 3, 2013

(54) PROPPANTS AND USES THEREOF

(75) Inventors: Dean Michael Willberg, Salt Lake City, UT (US); James G. Carlson, Lake Elmo, MN (US); Ignatius A. Kadoma, Cottage Grove, MN (US); Yong K. Wu, Woodbury, MN (US); Michael D. Crandall, North Oaks, MN (US)

(73) Assignees: 3M Innovative Properties Company, Saint Paul, MN (US); Schlumberger Technology Corporation, Sugar Land, TX (US)

( * ) Notice: Subject to any disclaimer, the term of this patent is extended or adjusted under 35 U.S.C. 154(b) by 571 days.

(21) Appl. No.: 12/808,121

(22) PCT Filed: Dec. 5, 2008

(86) PCT No.: PCT/US2008/085660
§ 371 (c)(1),
(2), (4) Date: Jun. 14, 2010

(87) PCT Pub. No.: WO2009/079233
PCT Pub. Date: Jun. 25, 2009

(65) Prior Publication Data
US 2010/0263865 A1  Oct. 21, 2010

Related U.S. Application Data

(60) Provisional application No. 61/013,998, filed on Dec. 14, 2007.

(51) Int. Cl.
*E21B 43/26* (2006.01)
*E21B 43/267* (2006.01)
*C09K 8/68* (2006.01)

(52) U.S. Cl.
USPC .......... 166/279; 507/203; 166/280.1

(58) Field of Classification Search
USPC .......................................... 507/203
See application file for complete search history.

(56) References Cited

U.S. PATENT DOCUMENTS

| | | | |
|---|---|---|---|
| 3,691,140 A | 9/1972 | Silver | |
| 4,406,850 A | 9/1983 | Hills | |
| 4,684,570 A | 8/1987 | Malaney | |
| 4,690,503 A | 9/1987 | Janssen | |
| 4,732,809 A | 3/1988 | Harris, Jr. | |
| 4,756,786 A | 7/1988 | Malaney | |

(Continued)

FOREIGN PATENT DOCUMENTS

| CN | 1936127 | 3/2007 |
|---|---|---|
| CN | 1949007 | 4/2007 |

(Continued)

OTHER PUBLICATIONS

U.S. Appl. No. 12/808,128, filed Jun. 14, 2010, Willberg et al.

(Continued)

*Primary Examiner* — Zakiya W Bates
*Assistant Examiner* — Silvana Runyan
(74) *Attorney, Agent, or Firm* — Mueting, Raasch and Gebhardt, P.A.

(57) ABSTRACT

Compositions comprising a proppant core having an outer surface and polymeric microspheres attached to at least a portion of the outer surface are described. The compositions are useful, for example, to increase the productivity of a hydrocarbon oil or gas bearing well.

20 Claims, 7 Drawing Sheets

(56) References Cited

U.S. PATENT DOCUMENTS

| | | | |
|---|---|---|---|
| 4,770,925 A | 9/1988 | Uchikawa | |
| 4,774,124 A | 9/1988 | Shimalla | |
| 5,017,268 A | 5/1991 | Clitherow | |
| 5,094,604 A | 3/1992 | Chavez | |
| 5,162,074 A | 11/1992 | Hills | |
| 5,185,204 A | 2/1993 | Shimizu | |
| 5,225,201 A | 7/1993 | Beaurline | |
| 5,302,443 A | 4/1994 | Manning | |
| 5,330,005 A | 7/1994 | Card et al. | |
| 5,380,477 A | 1/1995 | Kent | |
| 5,411,693 A | 5/1995 | Wust, Jr. | |
| 5,439,055 A | 8/1995 | Card et al. | |
| 5,456,982 A | 10/1995 | Hansen | |
| 5,458,472 A | 10/1995 | Kobayashi | |
| 5,460,884 A | 10/1995 | Kobylivker | |
| 5,501,274 A | 3/1996 | Nguyen | |
| 5,501,275 A | 3/1996 | Card et al. | |
| 5,540,992 A | 7/1996 | Marcher | |
| 5,551,514 A | 9/1996 | Nelson | |
| 5,591,199 A | 1/1997 | Porter | |
| 5,593,768 A | 1/1997 | Gessner | |
| 5,618,479 A | 4/1997 | Lijten | |
| 5,631,085 A | 5/1997 | Gebauer | |
| 5,633,082 A | 5/1997 | Berger | |
| 5,641,584 A | 6/1997 | Andersen | |
| 5,667,864 A | 9/1997 | Landoll | |
| 5,672,419 A | 9/1997 | Mukaida | |
| 5,698,322 A | 12/1997 | Tsai | |
| 5,714,256 A | 2/1998 | DeLucia | |
| 5,733,825 A | 3/1998 | Martin | |
| 5,756,625 A | 5/1998 | Crandall et al. | |
| 5,759,926 A | 6/1998 | Pike | |
| 5,765,256 A | 6/1998 | Allan et al. | |
| 5,776,838 A | 7/1998 | Dellinger | |
| 5,786,059 A | 7/1998 | Frank | |
| 5,798,305 A | 8/1998 | Horiuchi | |
| 5,871,049 A | 2/1999 | Weaver | |
| 5,891,119 A | 4/1999 | Ta | |
| 5,902,679 A | 5/1999 | Kojima | |
| 5,945,134 A | 8/1999 | Strait | |
| 5,972,463 A | 10/1999 | Martin et al. | |
| 5,989,004 A | 11/1999 | Cook | |
| 6,059,034 A | 5/2000 | Rickards | |
| 6,156,842 A | 12/2000 | Hoenig | |
| 6,172,011 B1 | 1/2001 | Card et al. | |
| 6,207,276 B1 | 3/2001 | Spindler | |
| 6,258,304 B1 | 7/2001 | Bahia | |
| 6,330,916 B1 * | 12/2001 | Rickards et al. | 166/280.2 |
| 6,391,443 B1 | 5/2002 | Terada et al. | |
| 6,417,121 B1 | 7/2002 | Newkirk | |
| 6,444,600 B1 | 9/2002 | Baek | |
| 6,528,157 B1 | 3/2003 | Hussain | |
| 6,689,242 B2 | 2/2004 | Bodaghi | |
| 6,732,800 B2 | 5/2004 | Acock | |
| 6,767,498 B1 | 7/2004 | Talley, Jr. | |
| 6,783,852 B2 | 8/2004 | Inada | |
| 6,875,506 B2 | 4/2005 | Husemann | |
| 6,906,009 B2 | 6/2005 | Shinbach et al. | |
| 7,459,209 B2 * | 12/2008 | Smith et al. | 428/403 |
| 7,767,298 B2 | 8/2010 | Nakatsuka | |
| 2003/0062160 A1 * | 4/2003 | Boney et al. | 166/278 |
| 2003/0104042 A1 | 6/2003 | Lucast et al. | |
| 2004/0092191 A1 | 5/2004 | Bansal et al. | |
| 2005/0124499 A1 | 6/2005 | Shinbach et al. | |
| 2005/0161411 A1 | 7/2005 | Boner | |
| 2005/0274517 A1 | 12/2005 | Blauch | |
| 2006/0016598 A1 | 1/2006 | Urbanek | |
| 2006/0032633 A1 | 2/2006 | Nguyen | |
| 2006/0035790 A1 | 2/2006 | Okell | |
| 2006/0063457 A1 | 3/2006 | Matsui | |
| 2006/0073980 A1 | 4/2006 | Brannon et al. | |
| 2006/0151170 A1 * | 7/2006 | Brannon et al. | 166/280.2 |
| 2006/0199006 A1 | 9/2006 | Poon | |
| 2007/0044958 A1 | 3/2007 | Rytlewski | |
| 2007/0066491 A1 | 3/2007 | Bicerano et al. | |
| 2007/0161515 A1 | 7/2007 | Bicerano et al. | |
| 2007/0281870 A1 | 12/2007 | Robb et al. | |
| 2008/0317984 A1 | 12/2008 | Yamashita | |
| 2009/0068463 A1 | 3/2009 | Mochizuki | |
| 2010/0263870 A1 | 10/2010 | Willberg et al. | |
| 2010/0282468 A1 | 11/2010 | Willberg et al. | |
| 2010/0288495 A1 | 11/2010 | Willberg et al. | |

FOREIGN PATENT DOCUMENTS

| | | |
|---|---|---|
| DE | 102005048442 | 4/2007 |
| EA | 200601465 A1 | 4/2007 |
| EP | 0089113 | 9/1983 |
| EP | 122827 | 10/1984 |
| EP | 138549 | 4/1985 |
| EP | 140415 | 5/1985 |
| EP | 159635 | 10/1985 |
| EP | 165817 | 12/1985 |
| EP | 171806 | 2/1986 |
| EP | 248598 | 12/1987 |
| EP | 260607 | 3/1988 |
| EP | 518690 | 12/1992 |
| EP | 538047 | 4/1993 |
| EP | 704001 | 12/1994 |
| EP | 906824 | 4/1999 |
| EP | 906972 | 4/1999 |
| EP | 929701 | 7/1999 |
| EP | 955404 | 11/1999 |
| EP | 963468 | 12/1999 |
| EP | 963472 | 12/1999 |
| EP | 991799 | 4/2000 |
| EP | 1290255 | 3/2003 |
| EP | 1300511 | 4/2003 |
| EP | 1326003 | 7/2003 |
| EP | 1373607 | 1/2004 |
| EP | 1466044 | 10/2004 |
| EP | 1476596 | 11/2004 |
| EP | 1 589 137 A1 | 9/2005 |
| EP | 1 577 426 A1 | 10/2005 |
| GB | 2319265 | 5/1998 |
| GB | 2337227 | 11/1999 |
| IE | 057094 | 4/1992 |
| JP | 4648725 | 9/2006 |
| JP | 2007084946 | 4/2007 |
| JP | 2007084954 | 4/2007 |
| JP | 2007084958 | 4/2007 |
| JP | 2007090913 | 4/2007 |
| JP | 2007091260 | 4/2007 |
| JP | 2007092229 | 4/2007 |
| JP | 2007092236 | 4/2007 |
| JP | 2007092266 | 4/2007 |
| JP | 2007105184 | 4/2007 |
| JP | 2007105185 | 4/2007 |
| JP | 2007107123 | 4/2007 |
| JP | 2007107126 | 4/2007 |
| JP | 2007107143 | 4/2007 |
| JP | 2007107144 | 4/2007 |
| JP | 2007113143 | 5/2007 |
| JP | 2007113153 | 5/2007 |
| JP | 2007113158 | 5/2007 |
| JP | 2007119975 | 5/2007 |
| JP | 2007119976 | 5/2007 |
| JP | 2007119977 | 5/2007 |
| RU | 2257465 | 4/2005 |
| WO | WO 9429506 | 12/1994 |
| WO | WO 9634134 | 10/1996 |
| WO | WO 9637644 | 11/1996 |
| WO | WO 9814647 | 4/1998 |
| WO | WO 9826118 | 6/1998 |
| WO | WO 9927229 | 6/1999 |
| WO | WO 0129295 | 4/2001 |
| WO | WO 0190464 | 11/2001 |
| WO | WO 0244447 | 6/2002 |
| WO | WO 03069039 | 8/2003 |
| WO | WO 2005/078235 A1 | 8/2005 |
| WO | WO 2007046052 | 4/2007 |
| WO | WO 2007046296 | 4/2007 |
| WO | WO 2007047844 | 4/2007 |
| WO | WO 2007049522 | 5/2007 |

(56) References Cited

FOREIGN PATENT DOCUMENTS

OTHER PUBLICATIONS

U.S. Appl. No. 12/808,117, filed Jun. 14, 2010, Willberg et al.
U.S. Appl. No. 12/808,115, filed Jun. 14, 2010, Willberg et al.
*American Petroleum Institute Method RP56*, "Recommended Practices for Testing Sand Used in Hydraulic Fracturing operations," Section 5, Second Edition, Dec. 1, 1995; 12 pgs.
International Search Report issued Jun. 29, 2009 for related Patent Application No. PCT/US2008/085660, 2 pgs.
Written Opinion issued by the Korean Intellectual Property Office on Jun. 29, 2009 for related Patent Application No. PCT/US2008/085660, 4 pgs.
International Preliminary Report on Patentability issued Jun. 15, 2010 by the International Bureau of WIPO for related Patent Application No. PCT/US2008/085660, 5 pgs.
Examination Report issued in China for Patent Application No. 200880121014.1, filed Dec. 5, 2008; Report issued Feb. 2, 2012; English Translation included; 7 pgs.
Examination Report issued in Gulf Cooperation Countries for Patent Application No. GCC/P/2008/12385, filed Dec. 14, 2008; Report issued Aug. 21, 2011; 4 pgs.
ASTM Designation: D 1895-96, "Standard Test Methods for Apparent Density, Bulk Factor, and Pourability of Plastic Materials", 2010, pp. 1-5.
ASTM Designation: D 3418-03, "Standard Test Method for Transition Temperatures of Polymers by Differential Scanning Calorimetry", 2004, pp. 331-337.
European Chemical News, vol. 54, No. 1426, p. 35, (Jun. 11, 1990).
"Factors Influencing the Release Profile from a Multiparticulate Delivery System", Amherst, NY, [online], [retrieved from the internet on May 13, 2011], Published on Mar. 27, 2003, IP.com No. 000011953D, <www.ip.com>, 3 pages.
"Factors Influencing the Physical Characteristics of Tablets", [online], [retrieved from the internet on May 13, 2011], Published on Aug. 12, 2003, IP.com No. 000018809D, <www.ip.com>, 2 pages.
Fibres, High Performance Textiles, p. 1-2, (Aug. 1993).
"Flame Retardants: The Bromine Controversy", Plastics Compounding, vol. 16, No. 5, pp. 29-40, (Sep./Oct. 1993).
Garg, "Biconstituent Fibres of Nylon 6-Poly(ethylene terephthalate)" Die Angewandte Makromolekulare Chemie, vol. 90, No. 1319, pp. 57-68, (1980).
Hong, Jet-Assisted Aerosol CVD for Multicomponent Particle Deposition, Chemical Vapor Deposition, vol. 12, pp. 627-630, (2006).
"Multi-Polymer Formulation", Amherst, NY, [online], [retrieved from the internet on May 13, 2011], Published on Jun. 28, 2004, IP.com No. 000029440D, <www.ip.com>, 2 pages.
Sevčenko, "Electrical Properties of Polymer Composite Structures Comprising Conductive Fibers", Plastics and Rubber with Section Coating Materials, vol. 32, No. 11, pp. 401-407, 1985.
Strauch, "Multi-component Injection Molding", Plastic Processor, vol. 36, No. 5, pp. 57-62, 1985.
"Sustained Release Formulations with Ciprofloxacin", Amherst, NY, [online], [retrieved from the internet on May 13, 2011], Published on Dec. 22, 2006, IP.com No. 000144216D, <www.ip.com>, 2 pages.
"Sustained Release Formulations with Gliclazide", Amherst, NY, [online], [retrieved from the internet on May 13, 2011], Published on Nov. 29, 2005, IP.com No. 000132029D, <www.ip.com>, 2 pages.
"Trützschler: To Listen to the Market Leads to Success", International Textile Bulletin, Feb. 2001, pp. 28-34.
International Search Report for Int'l Appln. No. PCT/US2008/086313, 4 pages.
Written Opinion of the ISA for Int'l Appln. No. PCT/US2008/086313, 4 pages.
International Search Report for Int'l Appln. No. PCT/US2008/086323, 4 pages.
Written Opinion of the ISA for Int'l Appln. No. PCT/US2008/086323, 4 pages.
U.S. Appl. No. 12/747,985, filed Jun. 14, 2010 Carlson.
U.S. Appl. No. 12/808,013, filed Jun. 14, 2010 Carlson.

\* cited by examiner

PROPPANTS AND USES THEREOF

This application is the §371 U.S. National Stage of International Application No. PCT/US2008/085660, filed 5 Dec. 2008, which claims the benefit of U.S. Provisional Application Nos. 61/013,998, filed 14 Dec. 2007, both of which are hereby incorporated by reference in their entireties.

BACKGROUND

Fracturing is a well stimulation technique designed to increase the productivity of a well, such as a hydrocarbon oil or gas well, by creating highly conductive fractures or channels in the producing geologic formation around the well. One approach is hydraulic fracturing, a process that involves injecting a fluid at a high rate and high pressure to rupture the formation and create cracks in the rock and pumping into these cracks a fluid containing a particulate material (propping agent or proppant) to maintain the cracks or fractures open by resisting the forces which tend to close the fractures. Thus, the function of the propping agent is to provide high permeability in the propped fracture. Hydraulic fracturing has been used with increasing frequency to improve the productivity of gas and oil wells in low permeability reservoirs. Another approach for forming and propping highly conductive fractures utilizes an etching solution such as the acid etching process.

Although there are a number of proppants known in the art, there is a continuing desire for additional proppant constructions.

SUMMARY

In one aspect, the present disclosure describes a composition comprising first proppant and first polymeric microparticles each having average diameters, wherein the ratio of the average diameter of the first proppant to the average diameter of the first polymeric microparticles is at least 10:1 (in some embodiments, at least 15:1, 20:1, 25:1, 30:1, 35:1, 40:1, 45:1, or even at least 50:1), and wherein the first polymeric microparticles have an elastic modulus of less than $3\times10^5$ N/m$^2$ at 1 Hz at least one temperature of greater than $-60°$ C. (in some embodiments, at least one temperature of greater than $-50°$ C., $-40°$ C., $-30°$ C., $-20°$ C., $-10°$ C., $0°$ C., $10°$ C., $20°$ C., $30°$ C., $40°$ C., $50°$ C., $60°$ C., $70°$ C., $80°$ C., $90°$ C., or even greater than $100°$ C.).

In one aspect, the present disclosure describes a composition comprising proppant and first polymeric microparticles, wherein the first polymeric microparticles are crosslinked and have an elastic modulus of less than $3\times10^5$ N/m$^2$ at 1 Hz at least one temperature below $100°$ C. (in some embodiments, at least one temperature below $90°$ C., $80°$ C., $70°$ C., $60°$ C., $50°$ C., $40°$ C., $30°$ C., $20°$ C., $10°$ C., $0°$ C., $-10°$ C., $-20°$ C., $-30°$ C., $-40°$ C., or even below $-50°$ C.).

In another aspect, the present disclosure described a method of making an article, the method comprising:
  providing a proppant having an outer surface; and
  attaching polymeric microparticles to at least a portion of the outer surface, wherein the polymeric microparticles are crosslinked and have an elastic modulus of less than $3\times10^5$ N/m$^2$ at 1 Hz at least one temperature below $100°$ C. (in some embodiments, at least one temperature below $90°$ C., $80°$ C., $70°$ C., $60°$ C., $50°$ C., $40°$ C., $30°$ C., $20°$ C., $10°$ C., $0°$ C., $-10°$ C., $-20°$ C., $-30°$ C., $-40°$ C., or even below $-50°$ C.).

In another aspect, the present disclosure described a method of making an article, the method comprising:
  providing a proppant core having an outer surface; and
  attaching polymeric microparticles to at least a portion of the outer surface, wherein the proppant and polymeric microparticles each having average diameters, wherein the ratio of the average diameter of the proppant to the average diameter of the polymeric microparticles is at least 10:1 (in some embodiments, at least 15:1, 20:1, 25:1, 30:1, 35:1, 40:1, 45:1, or even at least 50:1), and wherein the polymeric microparticles have an elastic modulus of less than $3\times10^5$ N/m$^2$ at 1 Hz at least one temperature of greater than $-60°$ C. (in some embodiments, at least one temperature of greater than $-50°$ C., $-40°$ C., $-30°$ C., $-20°$ C., $-10°$ C., $0°$ C., $10°$ C., $20°$ C., $30°$ C., $40°$ C., $50°$ C., $60°$ C., $70°$ C., $80°$ C., $90°$ C., or even greater than $100°$ C.).

In another aspect, the present disclosure described a method of making a composition comprising proppant and polymeric microparticles, the method comprising:
  selecting a subterranean formation, the formation having a temperature;
  generating, based at least in part on the formation temperature, a composition design comprising proppant and polymeric microparticles, wherein the polymeric microparticles have an elastic modulus less than $3\times10^5$ N/m$^2$ at 1 Hz at least the formation temperature (in some embodiments, at least one formation temperature greater than $-60°$ C., $-50°$ C., $-40°$ C., $-30°$ C., $-20°$ C., $-10°$ C., $0°$ C., $10°$ C., $20°$ C., $30°$ C., $40°$ C., $50°$ C., $60°$ C., $70°$ C., $80°$ C., $90°$ C., or even greater than $100°$ C.); and
  making the designed composition.

In another aspect, the present disclosure described a method of contacting a subterranean formation with a fluid composition, the method comprising:
  injecting the fluid composition into a well-bore, the well-bore intersecting the subterranean formation, the fluid composition comprising a carrier fluid and polymeric microparticles, wherein the polymeric microparticles have an elastic modulus less than $3\times10^5$ N/m$^2$ at 1 Hz at least one temperature of at least $-60°$ C. (in some embodiments, at least one temperature of greater than $-50°$ C., $-40°$ C., $-30°$ C., $-20°$ C., $-10°$ C., $0°$ C., $10°$ C., $20°$ C., $30°$ C., $40°$ C., $50°$ C., $60°$ C., $70°$ C., $80°$ C., $90°$ C., or even greater than $100°$ C.). In some embodiments, the fluid composition further comprises proppant, wherein, in some embodiments, the proppant and polymeric microparticles each having average diameters, wherein the ratio of the average diameter of the proppant to the average diameter of the polymeric microparticles is at least 10:1 (in some embodiments, at least 15:1, 20:1, 25:1, 30:1, 35:1, 40:1, 45:1, or even at least 50:1). In some embodiments, at least a portion of the polymeric microparticles are attached to at least a portion of the proppant. In some embodiments, at least a portion of the polymeric microparticles are provided to the fluid composition separately from the proppant. In some embodiments, at least a portion of the polymeric microparticles attach to the proppant subsequent to addition to the fluid composition.

In another aspect, the present disclosure described a method of contacting a subterranean formation with a fluid composition, the method comprising:
  injecting a fluid composition into a well-bore, the well-bore intersecting the subterranean formation, the fluid composition comprising a carrier fluid and polymeric microparticles, wherein the polymeric microparticles are crosslinked and have an elastic modulus of less than $3\times10^5$ N/m² at 1 Hz at least one temperature below 100° C. (in some embodiments, at least one temperature below 90° C., 80° C., 70° C., 60° C., 50° C., 40° C., 30° C., 20° C., 10° C., 0° C., −10° C., −20° C., −30° C., −40° C., or even below −50° C.). In some embodiments, the fluid composition further comprises proppant, wherein, in some embodiments, the proppant and polymeric microparticles each having average diameters, and wherein the ratio of the average diameter of the proppant to the average diameter of the polymeric microparticles is at least 10:1 (in some embodiments, at least 15:1, 20:1, 25:1, 30:1, 35:1, 40:1, 45:1, or even at least 50:1). In some embodiments, at least a portion of the polymeric microparticles are attached to at least a portion of the proppant. In some embodiments, at least a portion of the polymeric microparticles are provided to the fluid composition separately from the proppant. In some embodiments, at least a portion of the polymeric microparticles attach to the proppant subsequent to addition to the fluid composition.

In another aspect, the present disclosure described a method of contacting a subterranean formation with a fluid composition, the method comprising:

injecting a fluid composition into a well-bore, the well-bore intersecting the subterranean formation, the subterranean formation having a temperature, the fluid composition comprising a carrier fluid and polymeric microparticles, wherein the polymeric microparticles are crosslinked and have an elastic modulus of less than $3\times10^5$ N/m² at 1 Hz at least at a temperature not greater than the (in some embodiment, at least one temperature of greater than −60° C., −50° C., −40° C., −30° C., −20° C., −10° C., 0° C., 10° C., 20° C., 30° C., 40° C., 50° C., 60° C., 70° C., 80° C., 90° C., or even greater than 100° C.) temperature of the formation. In some embodiments, the fluid composition further comprises proppant, wherein, in some embodiments, the proppant and polymeric microparticles each having average diameters, and wherein the ratio of the average diameter of the proppant to the average diameter of the polymeric microparticles is at least 10:1 (in some embodiments, at least 15:1, 20:1, 25:1, 30:1, 35:1, 40:1, 45:1, or even at least 50:1). In some embodiments, at least a portion of the polymeric microparticles are attached to at least a portion of the proppant. In some embodiments, at least a portion of the polymeric microparticles are provided to the fluid composition separately from the proppant. In some embodiments, at least a portion of the polymeric microparticles attach to the proppant subsequent to addition to the fluid composition.

In another aspect, the present disclosure described a subterranean formation having a surface, wherein polymeric microparticles are adhered to at least a portion of the surface, and wherein the polymeric microparticles have an elastic modulus of less than $3\times10^5$ N/m² at 1 Hz. In some embodiments, the polymeric microparticles have an elastic modulus of less than $3\times10^5$ N/m² at 1 Hz at least one temperature of greater than −60° C. (in some embodiments, at least one temperature of greater than −50° C., −40° C., −30° C., −20° C., −10° C., 0° C., 10° C., 20° C., 30° C., 40° C., 50° C., 60° C., 70° C., 80° C., 90° C., or even greater than 100° C.). In some embodiments, the polymeric microparticles are crosslinked.

In another aspect, the present disclosure described a method of contacting a subterranean formation with a fluid composition, the method comprising:

injecting the fluid composition into a well-bore, the well-bore intersecting the subterranean formation, the subterranean formation having a surface, the fluid composition comprising a carrier fluid and polymeric microparticles, wherein the polymeric microparticles having an elastic modulus of less than $3\times10^5$ N/m² at 1 Hz at least −60° C.; and placing at least a portion of the polymeric microparticles onto at least a portion of the surface. In some embodiments, the fluid composition further comprises proppant. In some embodiments, the polymeric microparticles have an elastic modulus of less than $3\times10^5$ N/m² at 1 Hz at least one temperature of greater than −60° C. (in some embodiment, at least one temperature of greater than −50° C., −40° C., −30° C., −20° C., −10° C., 0° C., 10° C., 20° C., 30° C., 40° C., 50° C., 60° C., 70° C., 80° C., 90° C., or even greater than 100° C.).

Optionally, a composition disclosed herein further comprises second proppant and second polymeric microparticles, wherein the second polymeric microparticles have an elastic modulus that is less than (in some embodiments, less than $3\times10^5$ N/m² at 1 Hz, but generally not less than $1\times10^5$ N/m² at 1 Hz) at least −60° C. the elastic modulus of the first polymeric microparticles.

In some embodiments, the polymeric microparticles used herein have an average particle size up to one hundred micrometers (in some embodiments, up to 90, 80, 70, 60, 50, 40, 30, or even up to 20 micrometers). In some embodiments, the polymeric microparticles used herein are oil-wet (i.e., a microsphere having a surface upon which a droplet of oil spreads upon contact). In other embodiments the polymeric microparticles used herein are water-wet (i.e., a microsphere having a surface upon which a droplet of water spreads upon contact).

In some embodiments, the polymeric microspheres used herein comprise surfactant. In some embodiments, the proppant cores used here are ceramic (i.e., glass, crystalline ceramic, glass-ceramic, or a combination thereof). In some embodiments, the proppants used here includes cured resin coated proppant cores. In some embodiments, the microspheres used here are acid functionalized. In some embodiments, the microspheres used here are basic functionalized. In some embodiments, the polymeric microspheres used here have elasticity. In some embodiments, the polymeric microspheres used here have at least a bimodal distribution; in some embodiments, at least a trimodal distribution.

BRIEF DESCRIPTION OF THE DRAWINGS

For a more complete understanding of the features and advantages of the present invention, reference is now made to the detailed description of the invention along with the accompanying figures and in which.

DETAILED DESCRIPTION

Figure 1:
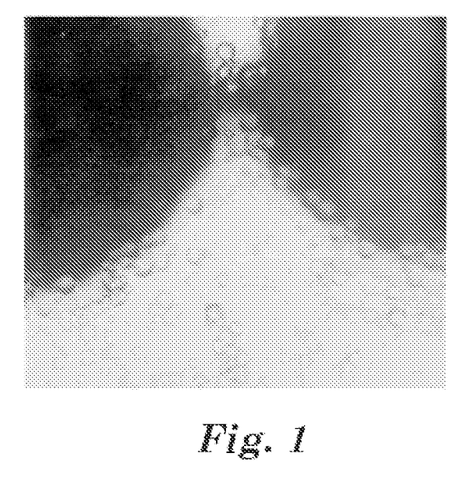
FIG. 1 is a photomicrograph at 40× magnification of an exemplary embodiment of a composition described herein.

Referring to FIG. 1, a photomicrograph at 40× magnification, an exemplary embodiment of a composition described herein has proppant and polymeric microspheres.

Exemplary proppants useful herein include those comprising a material selected from the group of sand, nut shells, aluminum, aluminum alloys, wood (e.g., wood chips), coke (e.g., crushed coke), slag (e.g., granulated slag), coal (e.g., pulverized coal), rock (e.g., crushed rock), metal (e.g., granules of steel), sintered bauxite, sintered alumina, refractories (e.g., mullite), and glass beads. The proppants can be in any of a variety of shapes and sizes. The desired size and shape may depend, for example, on factors such as the proppant material, the well fractures to be propped, the equipment to be used to inject the proppant particles into the well, and the carrier fluid used. For example, in some embodiments of the proppants may have a sphericity of less than about 0.9 (in some embodiments, less than about 0.7), as measured according to American Petroleum Institute Method RP56, "Recommended Practices for Testing Sand Used in Hydraulic Fracturing Operations", Section 5, (Second Ed., 1995) (referred to herein as "API RP 56").

Exemplary proppants will meet or exceed the standards for sphericity, roundness, size, turbidity, acid solubility, percentage of fines, and crush resistance as recited in API RP 56 for proppant. The API RP's describe the minimum standard for sphericity as at least 0.6 and for roundness as at least 0.6. As used herein, the terms "sphericity" and "roundness" are defined as described in the API RP's and can be determined using the procedures set forth in the API RP's. API RP 56 also sets forth some commonly recognized proppant sizes as 6/12, 8/16, 12/20, 20/40, 30/50, 40/70, and 70/140. The API RP's further note that a minimum percentage of particulates that should fall between designated sand sizes, noting that not more than 0.1 weight % of the particulates should be larger than the larger sand size and not more than a maximum percentage (1 weight % in API RP 56 and 2 weight % in API RP 58) should be smaller than the small sand size. Thus, for 20/40 proppant, no more than 0.1 weight % should be larger than 20 U.S. Mesh and no more than 1 weight smaller than 40 U.S. Mesh. API RP 56 describes the minimum standard for proppant turbidity as 250 FTU or less. API RP 56 describes the minimum standard for acid solubility of proppant as no more than 2 weight % loss when tested according to API RP 56 procedures for proppant sized between 6/12 Mesh and 30/50 Mesh, U.S. Sieve Series and as no more than 3 weight % loss when tested according to API RP 56 procedures for proppant sized between 40/70 Mesh and 70/140 Mesh, U.S. Sieve Series. API RP 56 describes the minimum standard for crush resistance of proppant as producing not more than the suggested maximum fines as set forth in Table 1 (below) for the size being tested.

TABLE 1

Suggested Maximum Fines of Proppant Subjected to Crushing Strength

| Mesh Size (U.S. Sieve Series) | Crushing Force (lbs)[kg] | Stress on Proppant (psi)[MPa] | Maximum Fines (% by weight) |
|---|---|---|---|
| 6/12 | 6,283 [2,850] | 2,000 [13.8] | 20 |
| 8/16 | 6,283 [2,850] | 2,000 [13.8] | 18 |
| 12/20 | 9,425 [4,275] | 3,000 [20.7] | 16 |
| 16/30 | 9,425 [4,275] | 3,000 [20.7] | 14 |
| 20/40 | 12,566 [5,700] | 4,000 [27.6] | 14 |
| 30/50 | 12,566 [5,700] | 4,000 [27.6] | 10 |
| 40/70 | 15,708 [7,125] | 5,000 [34.5] | 8 |
| 70/140 | 15,708 [7,125] | 5,000 [34.5] | 6 |

Typically, the proppants range in size from about 100 micrometers to about 3500 micrometers (in some embodiments from about 250 micrometers to about 2000 micrometers, or even from 500 micrometers to about 1000 micrometers). Proppants may be any shape, including spherical, hemispherical, pyramidal, rectangular (including cubed), cylindrical, tablet-shaped, pellet-shaped, and the like.

The size and distribution of the proppant may be chosen to fit the characteristics of the well being propped. In some embodiments, the polymeric microspheres have unimodal size distribution, while in other embodiments, at least a bimodal distribution; in some embodiments, at least a trimodal distribution.

In some embodiments, the proppants have a cured resin coating thereon. The cured resin may vary greatly in composition, type of cure required, thickness, hardness, toughness, flexibility, acid resistance, and the like, depending on the final application of the proppant articles of the invention, the base proppant material, the requirements of the polymeric microspheres to attach to the core, the coating, expected temperature range in the use environment, and all of these. Proppant articles of the invention may be colored, and the cured resin coating may facilitate coloring by suitable pigments, for example selected from carbon black, titanium dioxide, chrome oxide, yellow iron oxide, phthalocyanine green, phthalocyanine blue, red iron oxide, metal ferrites, and mixtures of these.

Suitable coatings may comprise cured versions of hide glue or varnish, or one or more resins such as phenolic, urea-formaldehyde, melamine-formaldehyde, urethane, epoxy, and acrylic resins. Phenolic resins include those of the phenol-aldehyde type. Suitable coatings include thermally curable resins, including phenolic resins, urea-aldehyde resins, urethane resins, melamine resins, epoxy resins, and alkyd resins. Although phenolic resins are discussed herein, it should be appreciated by those skilled in the art that the principles discussed herein are applicable to other thermally curable resins, such as those previously named. The monomers currently used in greatest volume to produce phenolic resins are phenol and formaldehyde. Other important phenolic starting materials are the alkyl-substituted phenols, including cresols, xylenols, p-tert-butyl-phenol, p-phenylphenol, and nonylphenol. Diphenols, (e.g., resorcinol (1,3-benzenediol) and bisphenol-A (bis-A or 2,2-bis(4-hydroxyphenyl)propane), are employed in smaller quantities for applications requiring special properties.

Exemplary polymeric microspheres can be made, for example, using a suspension polymerization process. In this example a one step suspension polymerization process is provided for preparing polymeric elastomeric microspheres comprising:

(a) stirring or agitating a mixture comprising polymerizable monomer starting materials comprising:
   (i) at least one $C_4$-$C_{14}$ alkyl (meth)acrylate monomer and, optionally at least one comonomer;
   ii) from about 0.1 to about 5 parts by weight of at least one vinyl-unsaturated additive having both an ionic moiety and a hydrophobic moiety and containing at least 5 but not more than 40 carbon atoms,
   (iii) an initiator for the polymerizable monomer starting materials present in amounts ranging from about 0.1 to about 2 parts per weight per 100 parts by weight of the polymerizable monomer starting materials;
   (iv) optionally, a polymeric stabilizer in an amount ranging from about 0.1 to about 3 parts by weight per 100 parts by weight of the polymerizable monomer starting materials;
   (v) a surfactant in an amount no greater than about 5 parts by weight per 100 parts by weight of polymerizable monomer, preferably no greater than about 3 parts by weight and most preferably ranging from about 0.5 to about 1.5 part by weight;

(vi) water to form an oil in water suspension; and (vii) optionally a modifier in an amount sufficient to provide a solvent soluble portion ranging from about 30 to about 98 percent by weight; and (b) polymerizing the (meth)acrylate monomer(s) and the comonomer(s), if present, to provide the microspheres. Examples of comonomers used are (A) ionic comonomers, such as sodium methacrylate, ammonium acrylate, sodium acrylate, (I) trimethylamine p-vinyl benzimide, (II) 4,4,9-trimethyl-4-azonia-7-oxo-8-oxa-dec-9-ene-1-sulphonate, (III) N,N-dimethyl-N-(β-methacryloxyethyl)ammonium propionate betaine, (IV) trimethylamine methacrylimide, (V) 1,1-dimethyl-1(2, 3-dihydroxypropyl)amine methacrylimide; any zwitterionic monomer and the like; (B) non-polar comonomers include but are not limited to, 4 methyl-2-pentyl acrylate, 2-methylbutyl acrylate, isoamyl acrylate, sec-butyl acrylate, n-butyl acrylate, isodecyl methacrylate, t-butyl acrylate, t-butyl methacrylate, isobornyl acrylate, octyl acrylamide, methylmethacrylate, isononyl acrylate, isodecyl acrylate, styrene and the like, and the combination thereof; (C) polar comonomers may or may not contain a dissociable hydrogen. Examples of suitable polar comonomers include organic carboxylic acids comprising 3 to about 12 carbon atoms and having generally 1 to about 4 carboxylic acid moieties. Examples of such monomers acrylic acid, methacrylic acid, itaconic acid, fumaric acid, crotonic acid, maleic acid, □ carboxyethylacrylate and the like. In addition suitable polar comonomers include acrylamide, methacrylamide, 2-hydroxyethyl acrylate, and the like.

In addition, one class of suitable comonomers are amino-functional monomers having a nucleus or portion of the nucleus of the general formula (1):

$$CH_2=CHR_1-C(O)-L-R_2-(NR_3R_4)x \quad (1)$$

wherein $R_1$ is $-H$, $-CH_3$, $-CH_2CH_3$, cyano or carboxymethyl;

$R_2$ is a hydrocarbyl radical comprising 1 to about 12 carbon atoms;

$R_3$ and $R_4$ are independently H or an alkyl group containing 1 to about 12 carbon atoms or an arylalkyl group or together form a cyclic or heterocyclic moiety;

L is carbon-carbon bond, O, NH or S; and x is an integer of 1 to 3.

Examples of comonomers according to formula (1) include N,N-dimethyl-aminoethyl(methyl)acrylate, N,N-dimethylaminopropyl-(meth)acrylate, t-butylaminoethyl(methyl)acrylate and N,N-diethylaminoacrylate.

Another class of suitable comonomers are comonomers having a nucleus or portion of the nucleus of the general formula (2):

$$CH_2=CHR_1-C(O)-L-R_2(R_5)xR_6 \quad (2)$$

wherein $R_1$ is H, $-CH_3$, $-CH_2CH_3$, cyano or carboxymethyl;

$R_2$ is a hydrocarbyl radical comprising 1 to about 12 carbon atoms;

$R_5$ is $-O-$, alkylene oxide comprising 1 to 5 carbon atoms, or phenoxy oxide, wherein the alkylene oxide would include, $-CH_2O-$, $-CH_2CH_2O-$, $CH_2(CH)CH_3O-$, and the like;

$R_6$ is H, $-C_6H_4OH$, or $-CH_3$

L is a carbon-carbon bond, O, NH or S; and x is an integer with the proviso that when $R_5$ is $-O-$, x is an integer of 1-3.

Examples of comonomers according to formula (2) include hydroxyethyl (meth)acrylate, glycerol mono(meth)acrylate and 4-hydroxybutyl (meth)acrylate, acrylate terminated poly(ethylene oxide); methacrylate terminated poly(ethylene oxide); methoxy poly(ethylene oxide) methacrylate; butoxy poly(ethylene oxide) methacrylate; acrylate terminated poly(ethylene glycol); methacrylate terminated poly(ethylene glycol); methoxy poly(ethylene glycol) methacrylate; butoxy poly(ethylene glycol) methacrylate and mixtures thereof.

Yet another class of suitable comonomers are amido-functional monomers having a nucleus or portion of the nucleus of the general formula (3):

$$CH_2=CHR_1-C(O)-NR_3R_4 \quad (3)$$

wherein $R_1$ is H, $-CH_3$, $-CH_2CH_3$, cyano or carboxymethyl; and $R_3$ and $R_4$ are independently H or an alkyl group containing 1 to about 12 carbons or an arylalkyl group or together form a cyclic or heterocyclic moiety. Examples of comonomers according to formula (3) include N-vinyl pyrrolidone, N-vinyl caprolactam acrylamide or N,N-dimethyl acrylamide. Examples of other suitable comonomers that do not fall within the above classes but are within the scope of permissible comonomers include (meth)acrylonitrile, furfuryl (meth)acrylate and tetrahydrofurfuryl (meth)acrylate, 2-vinyl pyridine, and 4 vinyl pyridine.

Exemplary polymeric microspheres can also be made, for example, by the following suspension polymerization process:

(a) stirring or agitating a mixture comprising polymerizable monomer starting materials comprising:

(i) one or more monofunctional vinyl polymerizable monomers;

(ii) optionally, one or more multifunctional vinyl polymerizable monomers;

(iii) an initiator for the polymerizable monomer starting materials present in amounts ranging from about 0.1 to about 5 parts by weight per 100 parts by weight of the polymerizable monomer starting materials;

(iv) optionally, a polymeric stabilizer in an amount ranging from about 0.1 to about 5 parts by weight per 100 parts by weight of the polymerizable monomer starting materials;

(v) optionally, an inorganic stabilizer such as tricalcium phosphate in an amount ranging from about 0.1 to about 5 parts by weight per 100 parts by weight of the polymerizable monomer starting materials;

(vi) optionally, a surfactant in an amount no greater than about 5 parts by weight per 100 parts by weight of polymerizable monomer (in some embodiments, no greater than about 3 parts by weight, and, in some embodiments, from about 0.5 to about 1.5 part by weight);

(vii) optionally, a chain transfer agent such as isooctyl thioglycolate, tetrabromomethane or others known to the art to modify molecular weight;

(vii) water to form an oil in water suspension; and (viii) polymerizing the monomers to provide the microspheres. Examples of monofunctional polymerizable monomers are styrene, (meth)acrylic esters, (meth) acrylic acid, substituted or unsubstituted (meth)acrylamides, glycidyl(meth)acrylate, hydroxypropyl (meth)acrylate, hydroxyethyl(meth)acrylate, ionic comonomers such as sodium methacrylate, ammonium acrylate, sodium acrylate, (I) trimethylamine p-vinyl benzimide, (II) 4,4,9-trimethyl-4-azonia-7-oxo-8-oxa-dec-9-ene-1-sulphonate, (III) N,N-dimethyl-N-(β-methacryloxyethyl) ammonium propionate betaine, (IV) trimethylamine methacrylimide, (V) 1,1-dimethyl-1(2,3-dihydroxypropyl)amine methacrylimide; any zwitterionic monomer and the like, itaconic acid, fumaric acid, crotonic acid, maleic acid, ☐ carboxyethylacrylate and the like. Examples of multifunctional vinyl polymerizable monomers are divinyl benzene and multifunctional(meth)acrylates such as hexanediol di(meth)acrylate trimethylolpropanetri(meth)acrylate, and the like.

Additional details on making exemplary microspheres can be found, for example, in U.S. Pat. Nos. 5,756,625 (Crandall et al.) and 3,691,140 (Silver), and US Patent Application Publication Number 2003/0104042 A1 (Lucast et al.), the disclosures of which are incorporated herein by reference.

Typically, the polymeric microspheres range in size from about 1 micrometer to about 3500 micrometers (in some embodiments, from about 1 micrometer to about 1000 micrometers, or even from about 10 micrometers to about 500 micrometers). In another aspect, the polymeric microspheres may be relatively spherical and have a morphology that is solid, or hollow with one or more inclusions.

In some embodiments, the polymeric microspheres have unimodal size distribution, while in other embodiments, at least a bimodal distribution; in some embodiments, at least a trimodal distribution. Blends of polymeric microspheres with different sizes may be advantageous in some applications.

In some embodiments, the polymeric microspheres are acid functionalized, for example, via the incorporation of acidic monomers. In some embodiments, the polymeric microspheres are basic functionalized, for example, via the incorporation of non-acidic monomers.

In some embodiments, the size ratio of proppant to polymeric microspheres is at least 3:1 (in some embodiments, at least 5:1, 10:1, 25:1, or even, at least 50:1; in some embodiments, in a range from 100:1 to 200:1). In some embodiments, the average number of polymeric microspheres attached a proppant is at least 20 (in some embodiments, at least 30, 50, or even at least 100).

Typically, the microspheres are made as an aqueous suspension as described above. Adding the proppant can be accomplished by a simple mixing of at least the aqueous suspension and the proppant, and this suspension can be used without further isolation of the microspheres. The suspension, for example, can be added to proppant, to a slurry containing the proppant, or the proppant can be added to a slurry containing the microspheres. Alternatively, for example, in some cases the microspheres can be isolated and dried and added in that form to proppants or slurries.

Compositions described herein may be used in wells in which fractures are produced using any of a variety of techniques that yield desired fractures in the underground rock formations (e.g., hydrofracturing; sometimes referred to as "hydrofracing"), in which proppant placement is desired.

Commonly, a fracturing fluid is used to initiate and propagate fractures and to transport a proppant to hold the walls of the fracture apart after the pumping has stopped and the fracturing fluid has leaked off or flowed back. Many known fracturing fluids comprise a water-based carrier fluid, a viscosifying agent, and the proppant. The viscosifying agent is often a cross-linked water-soluble polymer. As the polymer undergoes hydration and crosslinking, the viscosity of the fluid increases and allows the fluid to initiate the fracture and to carry the proppant. Another class of viscosifying agent is viscoelastic surfactants ("VES's"). Both classes of fracturing fluids (water with polymer, and water with VES) can be pumped as foams or as neat fluids (i.e., fluids having no gas dispersed in the liquid phase). Foamed fracturing fluids typically contain nitrogen, carbon dioxide, or mixtures thereof at volume fractions ranging from 10% to 90% of the total fracturing fluid volume. The term "fracturing fluid," as used herein, refers to both foamed fluids and neat fluids. Non-aqueous fracturing fluids may be used as well.

The carrier fluid that is used to deposit the composite proppant particles in the fracture may be the same fluid that is used in the fracturing operation or may be a second fluid that is introduced into the well after the fracturing fluid is introduced. As used herein, the term "introducing" (and its variants "introduced", etc.) includes pumping, injecting, pouring, releasing, displacing, spotting, circulating, or otherwise placing a fluid or material (e.g., proppant particles) within a well, wellbore, fracture or subterranean formation using any suitable manner known in the art.

A variety of aqueous and non-aqueous carrier fluids can be used in the compositions described herein. Illustrative examples of water based fluids and brines which are suitable for use with in the compositions described herein include fresh water, sea water, sodium chloride brines, calcium chloride brines, potassium chloride brines, sodium bromide brines, calcium bromide brines, potassium bromide brines, zinc bromide brines, ammonium chloride brines, tetramethyl ammonium chloride brines, sodium formate brines, potassium formate brines, cesium formate brines, and any combination thereof.

Examples of useful water-based polymer and polymer-containing treatment fluids for use with compositions described herein include any such fluids that can be mixed with the previously mentioned water based fluids. Specific water based polymer and polymer-containing treatment fluids for use with the present invention include guar and guar derivatives such as hydroxypropyl guar (HPG), carboxymethylhydroxypropyl guar (CMHPG), carboxymethyl guar (CMG), hydroxyethyl cellulose (HEC), carboxymethylhydroxyethyl cellulose (CMHEC), carboxymethyl cellulose (CMC), starch based polymers, xanthan based polymers, and biopolymers such as gum Arabic, carrageenan, and the like, as well as any combination of the above-mentioned fluids.

Illustrative examples of useful non-aqueous treatment fluids for use with materials described herein include alcohols such as methanol, ethanol, isopropanol, and other branched and linear alkyl alcohols; diesel; raw crude oils; condensates of raw crude oils; refined hydrocarbons such as gasoline, naphthalenes, xylenes, toluene and toluene derivatives, hexanes, pentanes, and ligroin; natural gas liquids, gases such as carbon dioxide and nitrogen gas, and combinations of any of the above-described non-aqueous treatment fluids. Alternatively, mixtures of the above non-aqueous fluids with water are also envisioned to be suitable for use in the compositions described herein, such as mixtures of water and alcohol or several alcohols. Mixtures can be made of miscible or immiscible fluids.

In addition to at least one polymer material and an optional cross-linker, a treatment fluid can include at least one breaker material. In this regard, any suitable breaker known in the well treating art may be employed in a polymer treatment fluid. Examples of suitable breaker materials include one or more oxidative breakers known in the well treating industry. Specific examples of suitable oxidative breakers include encapsulated breakers, such as encapsulated ammonium persulfate (such as those marketed by Schlumberger, Sugar Land, Tex., under the trade designation "EB-CLEAN").

Other suitable breakers which may be employed in a polymer treatment fluid include conventional oxidative breakers, such as ammonium peroxydisulfate. Typically, such breakers are included in a polymer treatment fluid in a concentration of between about 0.1 lb./1000 gal (10.3 g/m$^3$) and about 10 lb./100 gal (1031.8 g/m$^3$). The second fluid can also be heavily laden with breakers, water and/or scale control additives, paraffin control additives or other chemical components.

Proppants containing mixtures described herein can be mixed with a carrier fluid and introduced into a well having side wall fractures which are desired to be propped open to enhance transmission of subject fluids therethrough.

The carrier fluid carries the proppants and microspheres into the fractures where they are deposited. If desired, the proppants or microspheres, or both might be color coded and injected in desired sequence such that during transmission of subject fluid therethrough, the extracted fluid can be monitored for presence of the proppants. The presence and quantity of different colored proppants might be used as an indicator of what portion of the fractures are involved as well as indicate or presage possible changes in transmission properties.

Proppants containing mixtures described herein can be used in wells to enhance extraction of desired fluids (i.e., subject fluids) such as oil, natural gas, or water, from naturally occurring or man-made reservoirs containing mixtures described herein may also be used in wells to enhance injection of desired fluids into naturally occurring or man-made reservoirs.

In another aspect, compositions described herein can be customized for the particular application. For example, the temperature, water content, and ionic strength of the hydrocarbon-bearing subterranean clastic formation in which the proppants are to be used are determined. Based at least on part on these values, a proppant is designed, wherein the proppant and polymeric microspheres attached to at least a portion of the outer surface of the proppant, and wherein the polymeric microspheres are tacky at least the temperature of the hydrocarbon-bearing subterranean clastic formation. The "designed composition" can then be made, for example, using techniques described herein.

Optionally, proppant articles described herein may be used with other materials, including fibers, rheological modifiers, surfactants (including the previously mentioned VES systems), and other proppants. Fibers may be employed in fluid compositions of the invention, as taught in U.S. Pat. Nos. 5,330,005 (Card et al.); 5,439,055 (Card et al.); 5,501,275 (Card et al.); and 6,172,011 (Card et al.), all incorporated herein by reference. The addition of fibers in intimate mixtures with particulates for fracturing and gravel packing decreases or eliminates the undesirable flowback of proppant or formation fines while stabilizing the sand pack and lowering the demand for high polymer loadings in the placement fluids. Fibers are useful for forming a porous pack in the subterranean formation. In some cases, channels or fingers of void spaces with reduced concentrations of proppant may be introduced into the proppant pack.

Rheological modifiers may be added to fluid compositions when desired, for example to increase the modulus, which in turn increases the shear strength, friction pressure, or other flow characteristics of the fluid. Exemplary rheological modifiers may include water-based polymers previously mentioned as suitable for use as treatment fluids, such as guar and guar derivatives, cellulose and cellulose derivatives, polyacrylamides, polyacrylates, starch based polymers, xanthan based polymers, and biopolymers such as gum Arabic, carrageenan, and the like, as well as any combination of the above-mentioned fluids. The amount and type of rheological modifier used in any fluid composition of the invention is largely dictated by the specific chemistry of the carrier fluid, the polymeric microsphere composition, and the intended end use of the fluid composition. One would typically not use more than that amount required in order to achieve the increase in modulus and shear strength desired. Typically not more than 10% by weight of the fluid composition may be used, in some embodiments not more than 5% by weight, and in certain embodiments not more than 1% by weight of fluid composition.

EXAMPLES

The following examples are provided to illustrate some embodiments of the described compositions and methods and are not intended to limit the scope of the claims. All percentages are by weight unless otherwise noted.

Example 1

A two liter, three necked flask equipped with a thermometer, mechanical stirrer and nitrogen inlet tube was charged with 428 grams of deionized water, 12.5 grams of ammonium lauryl sulfate (obtained from Stepan Chemicals, Northfield, Ill. under the trade designation "STEPANOL AMV"), 1 gram of poly(N-vinyl pyrrolidinone) (obtained from ISP Chemicals, Inc., Wayne, N.J. under the trade designation "PLASDONE K-90"), and 2.75 grams of sodium styrene sulfonate (obtained from Sigma-Aldrich).

To this solution was added a solution of 544 grams of isooctyl acrylate (obtained from 3M Company, St. Paul, Minn.), 2.75 grams of N-vinyl pyrrolidinone (obtained from ISP Chemicals, Inc.), 0.19 gram of bis(4-t-butyl cyclohexyl) peroxydicarbonate (obtained from AKZO Nobel, Chicago, Ill., under the trade designation "PERKADOX 16N) and 0.83 gram of benzoyl peroxide (70% (by weight) in water; obtained from Arkema Inc., Philadelphia, Pa., under the trade designation "LUCIDOL-70"). The reaction mixture was agitated at 340 revolutions per minute, heated to 46° C. and purged with nitrogen. The agitation and nitrogen purge was maintained throughout the reaction period. The reaction exothermed after a few minutes and peaked at 90° C. The batch was maintained at 75° C. for 4 hours, cooled and filtered through a cheese cloth. The resulting microspheres had a mean volume diameter of 45 micrometers. The $T_g$ of the microspheres was calculated using the Fox equation to be −46° C.

A 200 ml polypropylene beaker was charged with 7.25 grams of the microspheres, 8 grams of ceramic proppant (obtained from Carbo Ceramics, Houston, Tex., under the trade designation "CARBO HSP" size $^{20}/_{40}$), 1 gram of acrylate emulsion (obtained from Rohm and Haas, Philadelphia, Pa., under the trade designation "ACRYSOL ASE-95") and 0.1 gram of potassium hydroxide (5% by weight aqueous solution, obtained from Sigma-Aldrich). The resulting mixture was stirred by hand for several minutes to evenly disperse the mixture.

The rheology of the proppant mixture was evaluated using a stress controlled rheometer (Model AR 2000 obtained from TA Instruments, New Castle, Del.) set at 150° C. The mixture was placed between two parallel plates of the rheometer and an applied force of about 10 Newtons (at least 10 Newtons) to ensure adequate wetting and contact. The upper plate was then detached at a measured pace of 10 micrometers/sec and the forces during entire removal monitored and recorded.

Figure 2A:
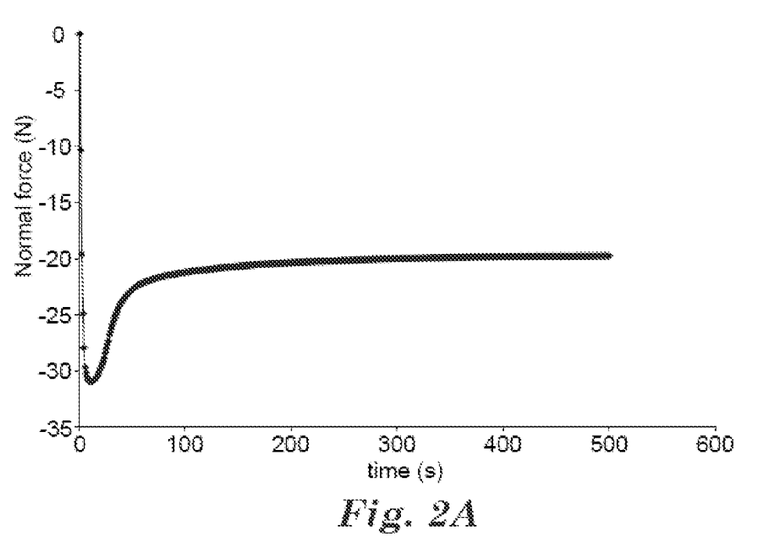
FIGS. 2A and 2B are graphical illustrations of rheology and shear strength test results of several exemplary proppants in Example 1.

This force is presented as a "negative" value as it resists detachment in a direction opposite to the movement of the upper plate. Results are shown in FIG. 2A plotted as a function of normal force (N) versus time in seconds (s).

Figure 2B:
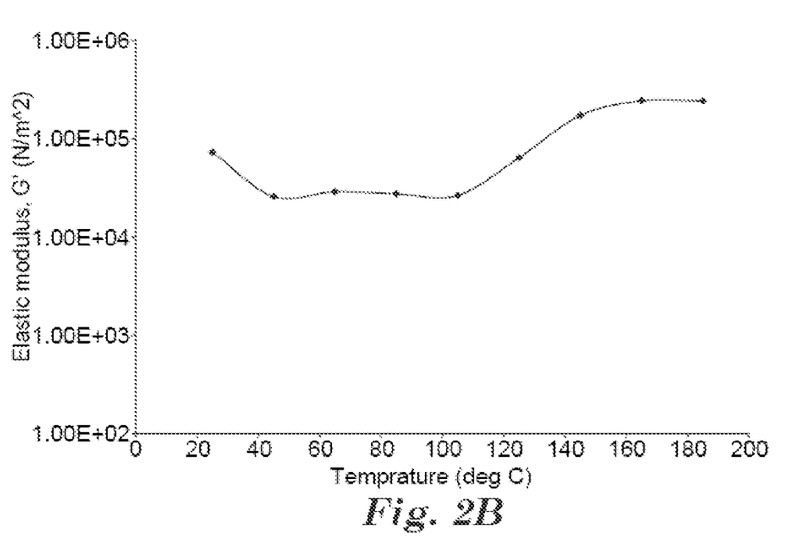

The shear strength of the proppant mixture as a function of temperature was also evaluated. The mixture was placed between two parallel plates of the rheometer (Model AR 2000). A sinusoidal frequency of 1 Hz at 1% strain applied over a temperature range of 25-185° C. was applied. Results are shown in FIG. 2B as a plot of log G' (Pa) versus temperature (° C.).

Example 2

Example 2 was prepared as described for Example 1, except that in preparing the proppant mixture, 1.8 gram of the microspheres, 10 grams of ceramic proppant ("CARBO HSP"), 0.25 gram of acrylate emulsion ("ACRYSOL ASE-95"), and 0.03 gram of 5% by weight aqueous potassium hydroxide (obtained from Sigma-Aldrich) were used.

Figure 3:
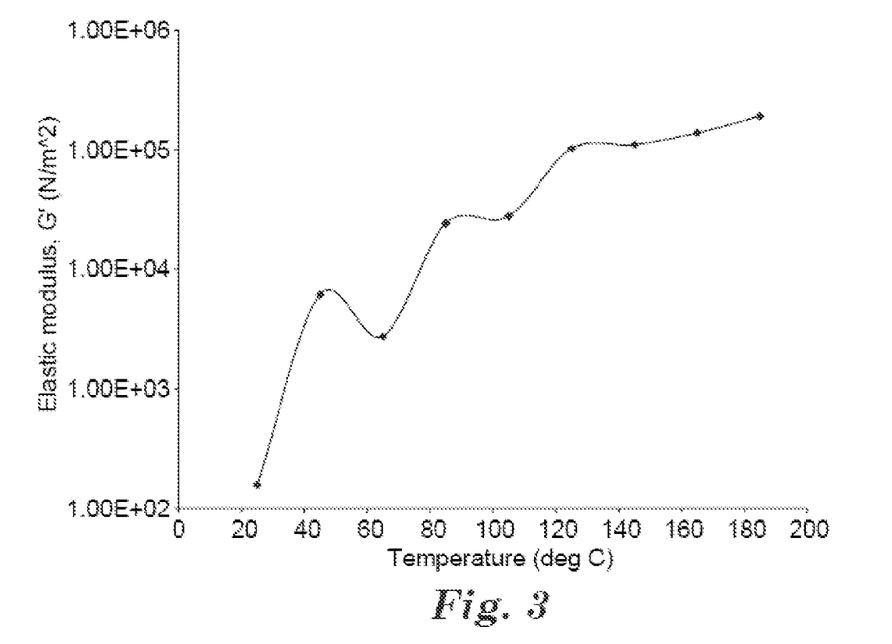
FIGS. 3-11 are graphical illustrations of the shear strength test results of several exemplary proppants according to the present disclosure and several comparative compositions.

The shear strength of the Example 2 proppant mixture as a function of temperature was evaluated as described in Example 1. The results are shown in FIG. 3.

Example 3

Figure 4:
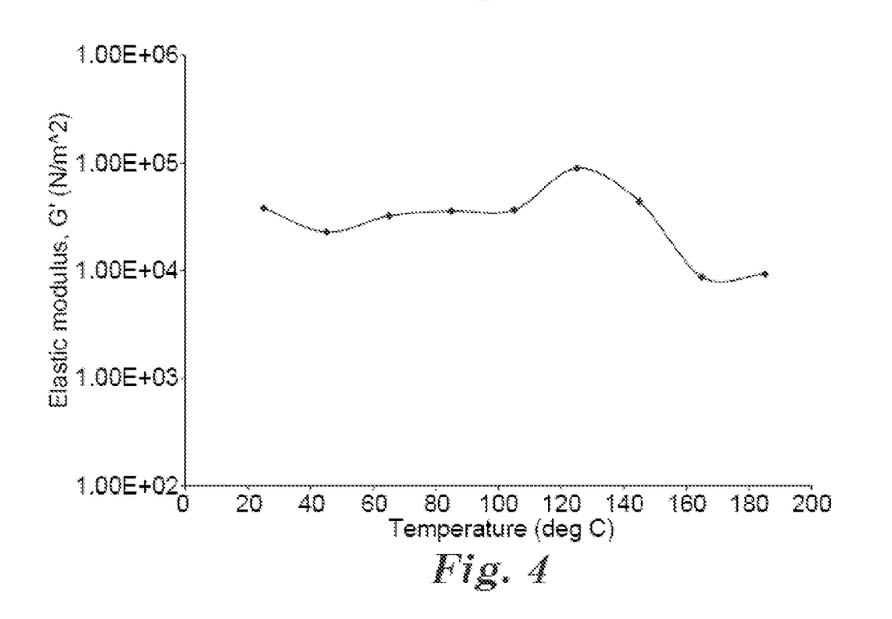

Example 3 was prepared as described for Example 2, except that in preparing the proppant mixture 7 grams of ceramic proppant ("CARBO HSP") was used. The shear strength of the Example 3 proppant mixture as a function of temperature was evaluated as described in Example 1. The results are shown in FIG. 4.

Comparative Example A

Figure 5:
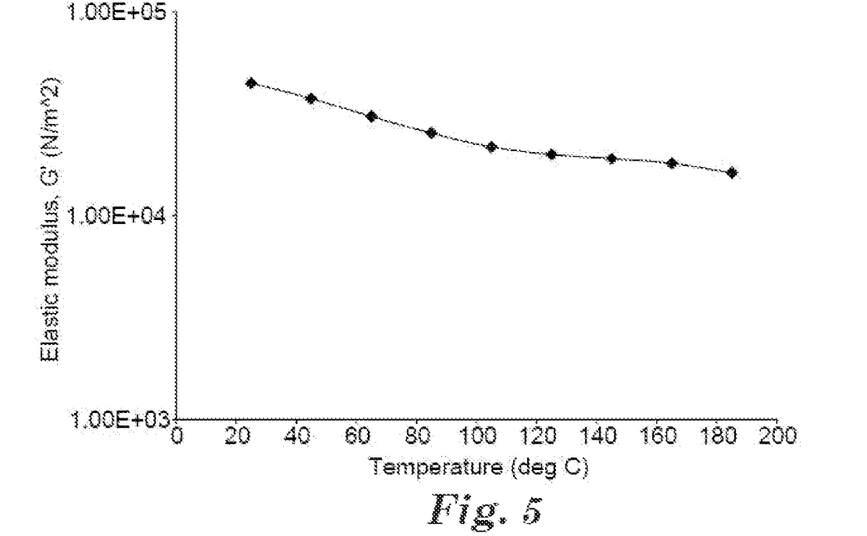

Comparative Example A was prepared as described for Example 1, except that only the microspheres (1.8 gram) were used. The shear strength of the microspheres as a function of temperature was evaluated as described in Example 1. The results are shown in FIG. 5.

Example 4

Example 4 was prepared as described for Example 1, except that the preparation of the microspheres used 538.5 grams of 2-ethylhexyl acrylate (obtained from Dow Chemical, Midland, Mich.), 5.49 grams of hydroxyethyl methacrylate (obtained from Mitsubishi Rayon, N.Y.), 0.55 gram of N-vinyl pyrrolidinone (obtained from ISP Chemicals, Inc.), 2.2 grams of sodium styrene sulfonate (obtained from Sigma-Aldrich), and 2.75 grams of polyethylene oxide acrylate (obtained from Shin-Nakamura, Arimoto, Japan, under the trade designation "M90G NK ESTER").

The mean particle diameter of the microspheres was 49 micrometers. The $T_g$ of the microspheres was calculated using the Fox equation to be −48° C.

A 200 ml polypropylene beaker was charged with 7.25 grams of microspheres, 8 grams of ceramic proppant ("CARBO HSP" size 20/40), 1 gram of acrylate emulsion ("ACRYSOL ASE-95"), and 0.1 gram of potassium hydroxide (5% by weight aqueous solution, obtained from Sigma-Aldrich). The resulting mixture was stirred by hand for several minutes to evenly disperse the mixture.

Figure 6:
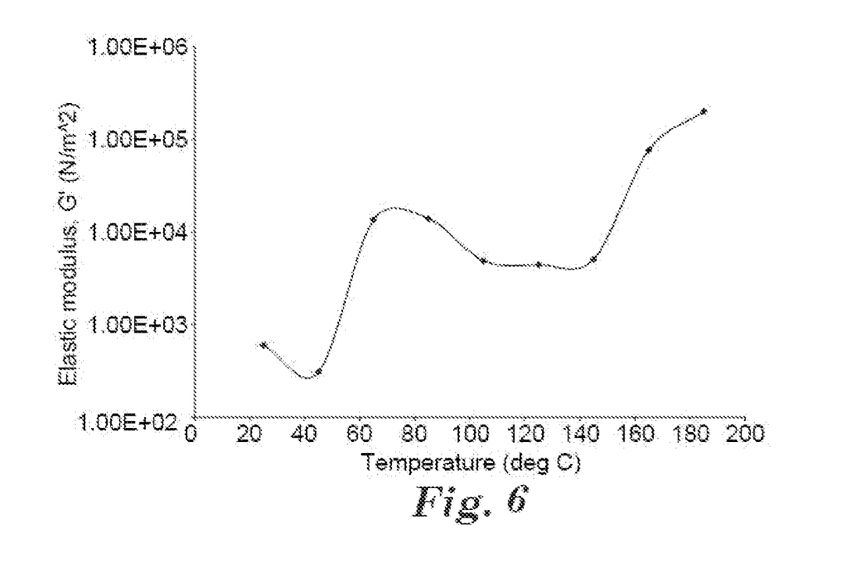

The shear strength of the Example 4 proppant mixture as a function of temperature was evaluated as described in Example 1. The results are shown in FIG. 6.

Comparative Example B

Figure 7:
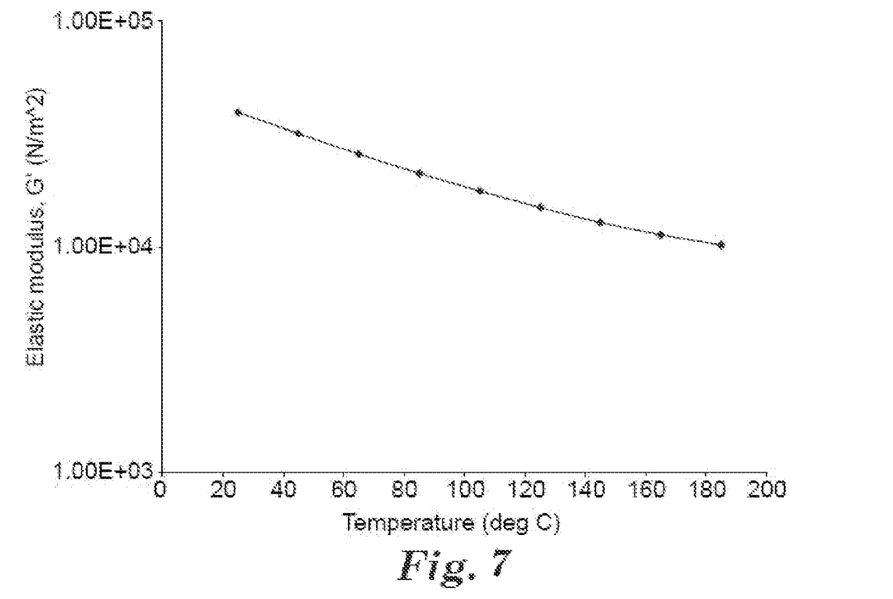

The procedure described for Example 2 was followed for Comparative Example B with the exception that only microspheres (1.82 gram) were used. The shear strength of the microspheres as a function of temperature was evaluated as described in Example 1. The results are shown in FIG. 7.

Example 5

A 500 ml indented 3-neck flask fitted with a stirrer was charged with 150 ml of deoxygenated distilled water, 47.4 grams of isooctyl acrylate (obtained from the 3M Company), 1.2 gram of acrylic acid (obtained from Sigma-Aldrich), 0.98 gram ammonium hydroxide (obtained from Sigma-Aldrich), 2.14 grams of ammonium lauryl sulfate ("STEPANOL AMV), and 0.15 gram of benzoyl peroxide (obtained from Sigma-Aldrich). The mixture was heated to 65° C., maintained for 20 hours with rapid stirring (about 550 rpm), cooled to 20° C., and filtered through cheesecloth to provide a suspension of tacky copolymer microspheres with a mean particle diameter of 39 micrometers. The $T_g$ of the microspheres was calculated using the Fox equation to be −41° C.

Example 6

Figure 8:
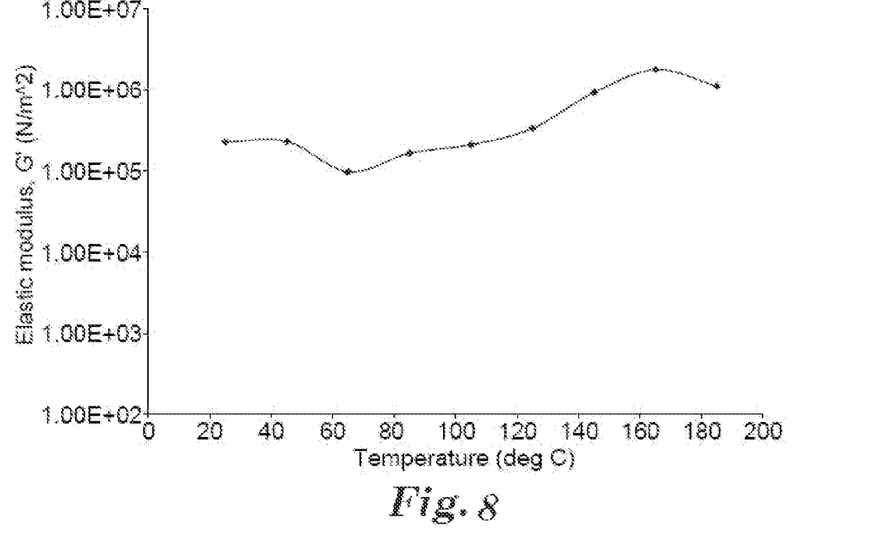

Example 6 was prepared as described for Example 1, except that 16.60 grams of the microspheres, 8.00 grams of ceramic proppant ("CARBO HSP"), 4.0 grams of acrylate emulsion ("ACRYSOL ASE-95"), and 0.40 gram of 5% by weight aqueous potassium hydroxide were used. The shear strength of the Example 6 proppant mixture as a function of temperature was evaluated as described in Example 1. The results are shown in FIG. 8.

Comparative Example C

Figure 9:
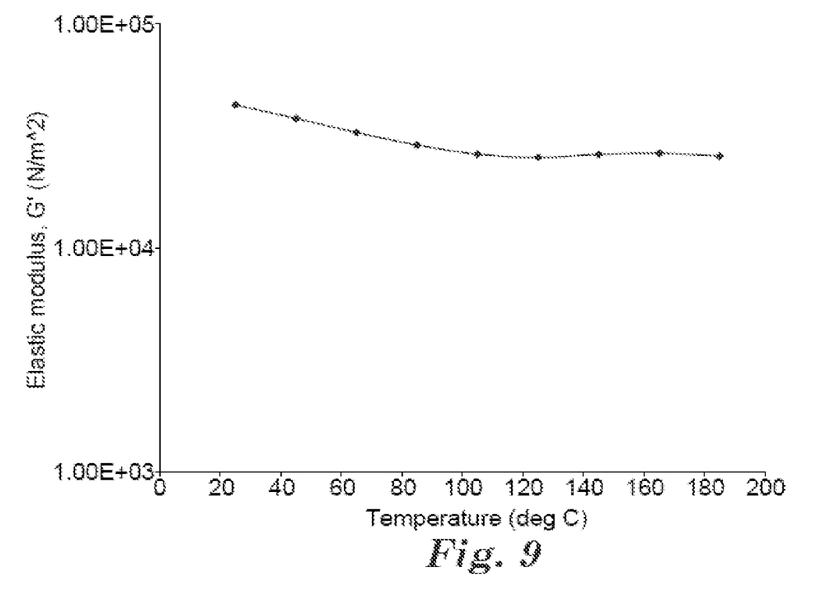

Comparative Example C was prepared as described for Example 2, except that only the microspheres (1.8 gram) were used. The shear strength of the microspheres as a function of temperature was evaluated as described in Example 1. The results are shown in FIG. 9.

Example 7

A monomer mixture was prepared by dissolving 8 grams of acrylic acid (obtained from Sigma-Aldrich), 11.8 grams of polyethylene oxide acrylate ("M90G NK ESTER"), and 1.1 gram of benzoyl peroxide (70% by weight in water; "LUCIDOL-70") in 377 grams of isooctyl acrylate (obtained from the 3M Company). A surfactant solution was prepared by dissolving 6.4 grams of ammonium lauryl sulfate (obtained from Cognis Corp, Hoboken, N.J. under the trade designation "STANDAPOL A") in 595 grams of water. The monomer mixture then was added to the surfactant solution, and the resulting mixture was emulsified using a mixer (obtained from J. W. Greer, Wilmington, Mass. under the trade designation "GIFFORD-WOOD") until the droplet size was less than 1 micrometer. The emulsion was charged to a 1 liter baffled reactor, heated to 65° C., degassed with nitrogen and allowed to react for 8 hours. Microspheres having a mean particle diameter of 2 micrometers resulted. The $T_g$ of the microspheres was calculated using the Fox equation to be −38° C.

Figure 10:
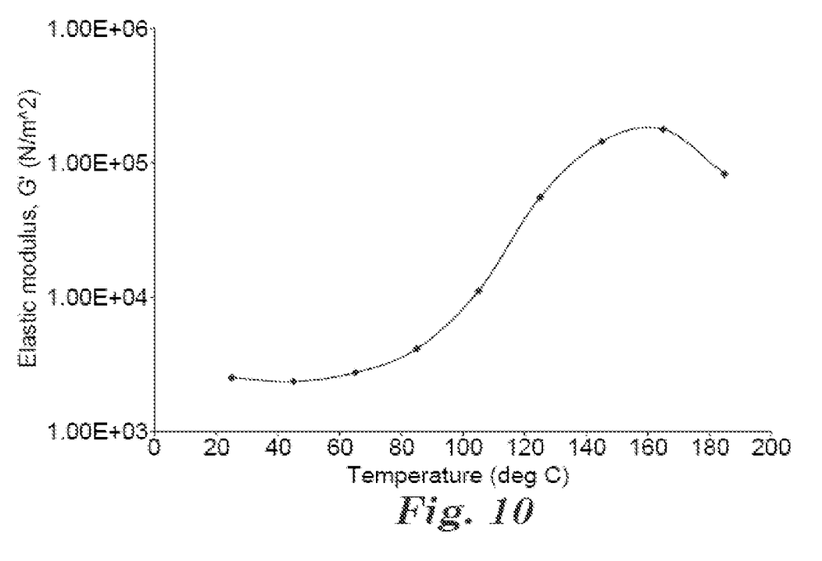

The resulting microspheres were formulated into proppant mixtures as described in Example 2, except that 10.2 grams of the microspheres were used. The shear strength of the Example 7 proppant mixture as a function of temperature was evaluated as described in Example 1. The results are shown in FIG. 10.

Comparative Example D

Figure 11:
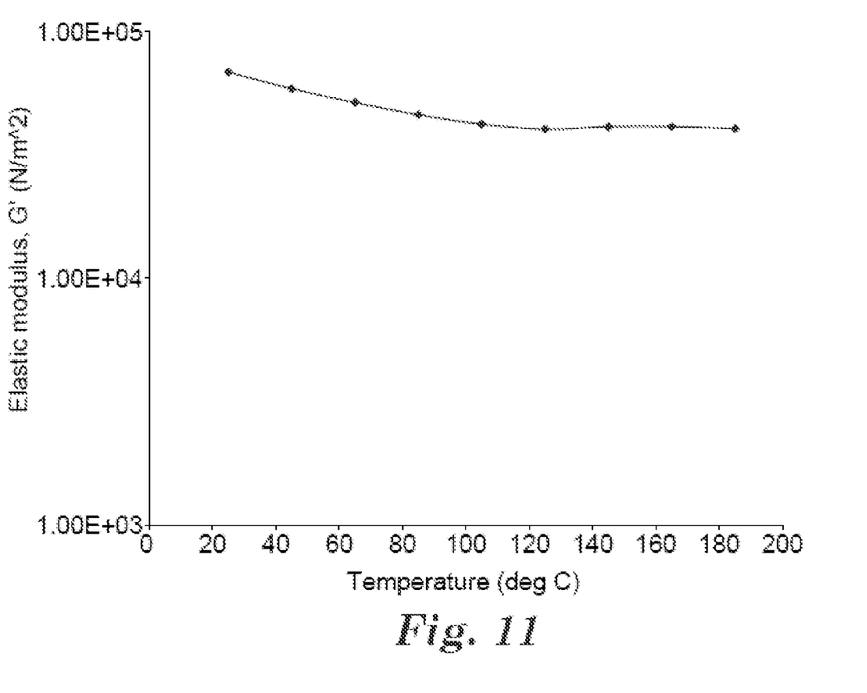

Comparative Example D was prepared as described for Example 2, except that only the microspheres (1.82 gram) were used. The shear strength of the microspheres as a function of temperature was evaluated as described in Example 1. The results are shown in FIG. 11.

Example 8

To a 2 liter resin flask was added 900 grams of deionized water and 4.5 grams of polyvinyl alcohol (obtained from Celanese Corporation, Dallas, Tex. under the trade designation "CELVOL 350"). The mixture was heated to 90° C. under nitrogen with agitation for 30 minutes. The reactor was cooled to 75° C. and the following monomer mixture was added: 135 grams of styrene (obtained from Sigma-Aldrich), 1.5 gram of divinylbenzene (obtained from Sigma-Aldrich), 133.5 grams of isooctyl acrylate (obtained from the 3M Company), 30 grams of methacrylic acid (obtained from Sigma-Aldrich), and 0.30 gram of azobis-2-methylbutyronitrile (obtained from DuPont, Wilmington, Del. under the trade designation "VAZO 67"). The reaction was maintained at 75° C. with stirring for 16 hours whereupon it was heated to 105° C. for 2 hours with distillation of unreacted monomer. The product was cooled and filtered through cheesecloth and washed to provide beads having a particle size from about 100 to 400 micrometers. These beads had a glass transition temperature of 110° C. as measured by differential scanning calorimetry.

Example 9

Example 9 was prepared as described for Example 8, except the monomer mixture was made from 269 grams of styrene (obtained from Sigma-Aldrich), 1.5 gram of divinylbenzene (obtained from Sigma-Aldrich), 30 grams of methacrylic acid (obtained from Sigma-Aldrich), and 0.3 gram of azobis-2-methylbutyronitrile ("VAZO 67"). Beads having a particle size from about 100 to 400 micrometers were obtained. These beads had a glass transition temperature of 22° C. as measured by differential scanning calorimetry.

Example 10

Microsphere Adhesive Example

A. Proppant Flowback Stability Measurements

The proppant flowback stability measurements were performed in an apparatus consisting of the following assemblies: 1) a flowback cell which contained the sand or proppant pack being tested, 2) a circulation system which pumped water through the proppant pack in the cell, and 3) a hydraulic press that applied a uniaxial closure stress onto the proppant pack. The flowback cell consisted of a rectangular body that had an interior 5.25 in.×5.25 in. (13.3 cm×13.3 cm) working area which held the proppant pack. After the cell was filled with the proppant, sand and flowback agent (if any) a square piston was inserted into the body on top of the proppant pack. Water was then pumped through the rectangular proppant pack from an upstream inlet side through to the discharge side. On the upstream side of the cell, there were three 13 mm inlets for the inflow of water. On the discharge side of the cell there was a 10 mm outlet that represented a perforation. That is, the sandpack was free to move if it had insufficient strength to withstand the stresses generated by the flow of water. After the flowback cell was filled and assembled, it was placed in the hydraulic press which then applied the designated closure stress to the proppant pack. The system was equipped with a computer control and data acquisition to measure pack width, flow rate and upstream pressure.

The proppant flowback stability measurements were performed on a sand pack made from pure fracturing sand of 20/40 mesh (according to API RP 56) obtained from Badger Mining Corporation, Berlin, Wis., and the flowback control additives. The total mass of the solids in the pack (sand plus flowback control additives) was set at 400 grams. The uniaxial closure stress was set to 4000 psi (27.6 MPa), and the tests were performed at 25° C. At the start of each test the flow rate of water was zero. As the tests progressed the flow rate of water was continuously increased at a rate of 4 L/min. until pack failure was observed. The flow rate at the pack failure was used as a characteristic of the flowback stability of the proppant pack.

B. Sample Preparation and Flowback Performance

A mixture of 400 grams of pure fracturing sand of 20/40 mesh (according to API RP 56) obtained from Badger Mining Corporation, Berlin, Wis. and a sample of the microsphere adhesive made in Example 1 (average size 60 micrometers) suspension (4 wt %) dried at 80° C. was placed into the cell, then closure stress applied and cell filled with water. The pack failed at 3.6 L/min. flow rate compared to 0.5-0.8 L/min. failure flow rate of pure sand. The sand pack was reinforced by the adhesive particles (additive) that provided additional bonding between proppant particles.

Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A composition comprising first proppant and first polymeric microparticles each having average diameters, wherein the ratio of the average diameter of the first proppant to the average diameter of the first polymeric microparticles is at least 10:1, and wherein the first polymeric microparticles have an elastic modulus of less than $3 \times 10^5$ N/m$^2$ at 1 Hz at at least one temperature of greater than −60° C.

2. The composition according to claim 1, further comprising second proppant and second polymeric microparticles, wherein the second polymeric microparticles have an elastic modulus that is less than the elastic modulus of the first polymeric microparticles.

3. The composition according to claim 1, wherein the polymeric microparticles are oil-wet.

4. The composition according to claim 1, wherein the polymeric microparticles are water-wet.

5. A method of making a composition of claim 1, the method comprising:
  providing a first proppant core having an outer surface; and
  attaching first polymeric microparticles to at least a portion of the outer surface, wherein the proppant and polymeric microparticles each having average diameters.

6. A composition comprising first proppant and first polymeric microparticles, wherein the first polymeric microparticles are crosslinked and have an elastic modulus of less than $3 \times 10^5 \text{N/m}^2$ at 1 Hz at at least one temperature below 100° C.

7. The composition according to claim 6, wherein the polymeric microparticles have an average particle size up to one hundred micrometers.

8. The composition according to claim 6, further comprising second proppant and second polymeric microparticles, wherein the second polymeric microparticles have an elastic modulus that is less than the elastic modulus of the first polymeric microparticles.

9. A method of making the composition of claim 6, the method comprising:
providing a first proppant having an outer surface; and
attaching first polymeric microparticles to at least a portion of the outer surface.

10. A method of contacting a subterranean formation with a fluid composition, the method comprising:
injecting the fluid composition into a well-bore, the well-bore intersecting the subterranean formation, the fluid composition comprising a carrier fluid and polymeric microparticles, wherein the polymeric microparticles have an elastic modulus less than $3 \times 10^5 \text{ N/m}^2$ at 1 Hz at at least one temperature of at least −60° C.

11. The method according to claim 10, wherein the fluid composition further comprises proppant.

12. The method according to claim 11, wherein at least a portion of the polymeric microparticles are attached to at least a portion of the proppant.

13. The method according to claim 11, wherein at least a portion of the polymeric microparticles are provided to the fluid composition separately from the proppant.

14. The method according to claim 11, wherein at least a portion of the polymeric microparticles attach to the proppant subsequent to addition to the fluid composition.

15. The method according to claim 10 wherein the subterranean formation
placing at least a portion of the polymeric microparticles onto at least a portion of the surface.

16. A method of contacting a subterranean formation with a fluid composition, the method comprising:
injecting the fluid composition into a well-bore, the well-bore intersecting the subterranean formation, the fluid composition comprising a carrier fluid and polymeric microparticles, wherein the polymeric microparticles are crosslinked and have an elastic modulus of less than $3 \times 10^5 \text{N/m}^2$ at 1 Hz at at least one temperature below 100° C.

17. The method according to claim 16, wherein the fluid composition further comprises proppant.

18. The method according to claim 17, wherein at least a portion of the polymeric microparticles are attached to at least a portion of the proppant.

19. The method according to claim 17, wherein at least a portion of the polymeric microparticles are provided to the fluid composition separately from the proppant.

20. The method according to claim 17, wherein at least a portion of the polymeric microparticles attach to the proppant subsequent to addition to the fluid composition.

\* \* \* \* \*

UNITED STATES PATENT AND TRADEMARK OFFICE
CERTIFICATE OF CORRECTION

Page 1 of 1

PATENT NO.       : 8,596,361 B2
APPLICATION NO.  : 12/808121
DATED            : December 3, 2013
INVENTOR(S)      : Dean Michael Willberg et al.

It is certified that error appears in the above-identified patent and that said Letters Patent is hereby corrected as shown below:

In the Specification
In column 1, line 42: Delete "at" and insert -- at at --, therefor.
In column 1, line 43: Delete "at" and insert -- at at --, therefor.
In column 1, line 51: Delete "at" and insert -- at at --, therefor.
In column 1, line 52: Delete "at" and insert -- at at --, therefor.
In column 1, line 61: Delete "at" and insert -- at at --, therefor.
In column 1, line 62: Delete "at" and insert -- at at --, therefor.
In column 2, line 10: Delete "at" and insert -- at at --, therefor.
In column 2, line 12: Delete "at" and insert -- at at --, therefor.
In column 2, line 25: Delete "at" and insert -- at at --, therefor.
In column 2, line 26: Delete "at" and insert -- at at --, therefor.
In column 2, line 39: Delete "at" and insert -- at at --, therefor.
In column 2, line 41: Delete "at" and insert -- at at --, therefor.
In column 3, line 1: Delete "at" and insert -- at at --, therefor.
In column 3, line 2: Delete "at" and insert -- at at --, therefor.
In column 3, line 32: Delete "at" and insert -- at at --, therefor.
In column 3, line 58: Delete "at" and insert -- at at --, therefor.
In column 3, line 59: Delete "at" and insert -- at at --, therefor.
In column 4, line 6: Delete "at" and insert -- at at --, therefor.
In column 4, line 12: Delete "at" and insert -- at at --, therefor.
In column 4, line 14: Delete "at" and insert -- at at --, therefor.
In column 4, line 23: Delete "at" and insert -- at at --, therefor.
In column 5, line 37: After "weight" insert -- % --.
In column 11, line 39: Delete "at" and insert -- at at --, therefor.

In the Claims
In column 18, line 8: In Claim 15, after "formation" insert -- has a surface, the method further comprising --.

Signed and Sealed this
Twenty-sixth Day of May, 2015

Michelle K. Lee
*Director of the United States Patent and Trademark Office*